United States Patent [19]
Krietzman et al.

[11] Patent Number: 6,021,741
[45] Date of Patent: Feb. 8, 2000

[54] ROLLING CAT SCRATCHER

[76] Inventors: Mark Howard Krietzman, P.O. Box 3185, Palos Verdes Estates, Calif. 90274; Robert Alan Krietzman, 678 Amesti Rd., Wastonville, Calif. 95076

[21] Appl. No.: 09/159,911

[22] Filed: Sep. 24, 1998

Related U.S. Application Data

[60] Provisional application No. 60/067,710, Dec. 1, 1997.

[51] Int. Cl.$^7$ .................................................. A01K 29/00
[52] U.S. Cl. .................................................................. 119/706
[58] Field of Search ..................................... 119/706, 707, 119/709, 710, 711; 210/493.5; 449/4; 242/610.4; 221/312.4

[56] References Cited

U.S. PATENT DOCUMENTS

| | | | |
|---|---|---|---|
| 3,993,027 | 11/1976 | Mullin | 119/706 |
| 4,257,134 | 3/1981 | Niebur | 449/4 X |
| 4,611,556 | 9/1986 | Frank | 119/706 |
| 4,878,930 | 11/1989 | Manniso et al. | 210/493.5 X |
| 4,940,244 | 7/1990 | Batts, II | 273/403 |

*Primary Examiner*—Robert P. Swiatek
*Attorney, Agent, or Firm*—Mark Krietzman

[57] ABSTRACT

A cylindrical or conical rolling cat scratching device which provides a series of corrugated cardboard surfaces, to which catnip may be added.

16 Claims, 3 Drawing Sheets

ROLLING CAT SCRATCHER

RELATED APPLICATIONS

The within invention claims the benefit under Title 35, United States Code § 119 (e) of Provisional Application 60/067,710, entitled "Rolling Cat Toy", filed Dec. 1, 1997.

TECHNICAL FIELD OF THE INVENTION

This invention relates to cat scratching devices and cat exercise devices, more particularly, to a tubular cardboard body constructed of corrugated disks which may be loaded with catnip to entice a cat to scratch the device rather than furniture.

There has long been a need for such a exercise device of this type which replaces a sofa arm or chair as the preferred scratching surface and may alleviate boredom and destructive behavior.

BACKGROUND ART

Cardboard scratching surfaces for cats to use are known in the art. They are used in both stand-alone configurations or in disk shaped configuration which may fit inside the center of a trackball enclosure such as that taught in U.S. Pat. No. D359822 issued to McCance.

None of the solutions provide a cardboard scratching device which rolls across the ground during play, has a 360 degree scratching surface and may be used by the cat while standing or while the cat is on its back.

SUMMARY OF THE INVENTION

Accordingly, it is an object of the present invention to provide a novel pet exercise device for pet animals such as cats.

It is yet another object of this invention to provide a rolling scratching surface for a cat to scratch at.

It is yet another object of this invention to provide a rolling corrugated cardboard scratching surface for a cat to scratch at.

It is yet another object of this invention to provide a rolling corrugated cardboard scratching surface which by virtue of its pre-determined shape will roll in a radius pattern.

It is yet another object of this invention to provide a rolling corrugated cardboard scratching which may be seeded with catnip.

It is yet another object of this invention to provide a rolling corrugated cardboard scratching surface with apertures through which feathers affixed to an inner core may be attacked to further encourage the cat to scratch at the device.

The features of the invention believed to be novel are set forth with particularity in the appended claim. The invention itself, however, both as to configuration, and method of operation, and the advantages thereof, may be best understood by reference to the following descriptions taken in conjunction with the accompanying drawings.

MODES FOR CARRYING OUR THE INVENTION

Figures 1A, 1B:
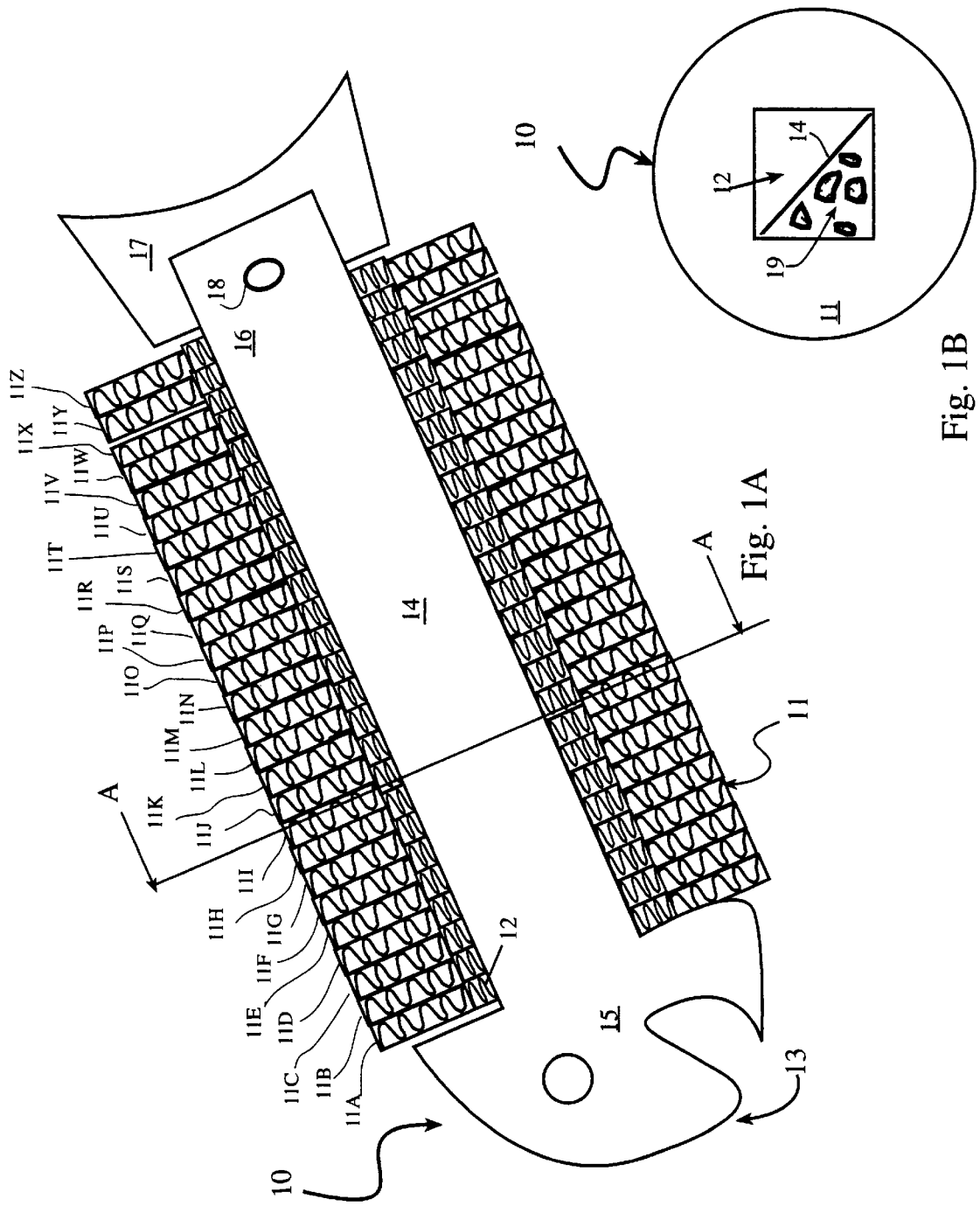
FIG. 1A illustrates a cut-away side view of the preferred embodiment of the device.
FIG. 1B illustrates a sectional view at line A—A of the embodiment of FIG. 1A.

Referring now to the drawings, there is illustrated in FIG. 1A a cut-away side view of the preferred embodiment of the rolling cardboard cat scratcher generally designated 10.

The tubular scratching insert 11 is a roughly cylindrical tube formed of a plurality of die-cut circular corrugated cardboard disks 11A–11Z which are held together by disk spline guides 12 die-cut in the center of each corrugated cardboard disk 11A–11Z, a rigid disk support structure 13 is formed with an internal spline 14, a representational head 15 formed at one end of the internal spline 14 and a narrow end 16 formed on the other end. The cardboard disks 11A–11Z may be held together by inserting the narrow end 16 through the disk spline guides 12 and then attaching the representational tail 17, onto the narrow end 16 with a rivet 18, whereby the corrugated cardboard disks 11A–11Z are held firmly in place on the internal spline 14 of disk support 13 between the representational head 15 and representational tail 17.

Referring now to FIG. 1B there is illustrated a cut-away view, along line A—A of FIG. 1A, generally designated 10.

The cardboard disk 11 has a disk spline guide 12 in a square shape die-cut through its center. The internal spline 14 is fit corner to corner across the middle of the disk spline guide 12 preventing the cardboard disk 11 from rotating. Catnip 19 may be added to the disk spline guides 12 to further entice the cat to scratch the device.

Figure 2:
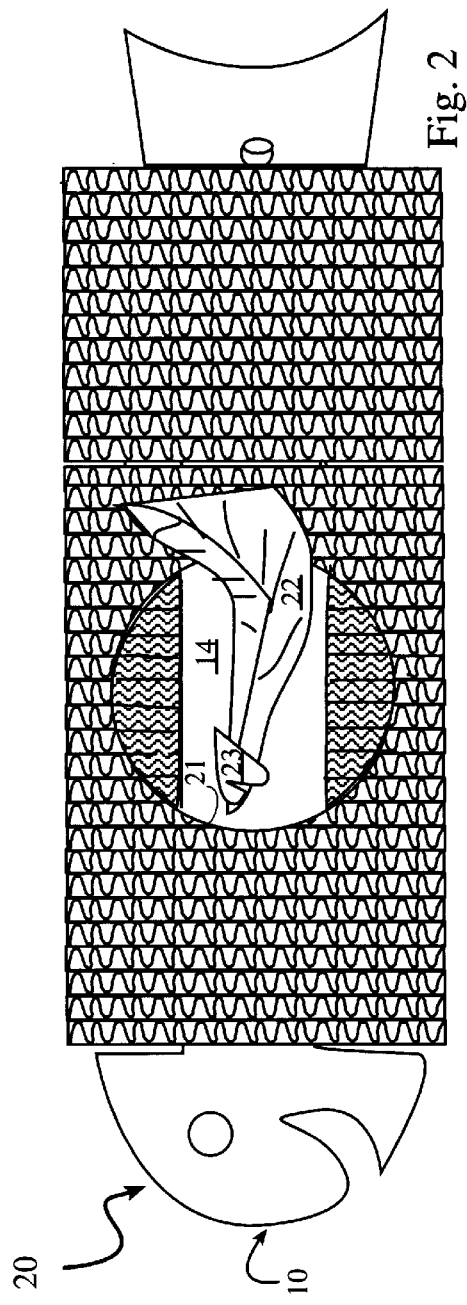
FIG. 2 illustrates a side view of an alternate embodiment of the device.

Referring now to FIG. 2 there is illustrated a side view of an alternate embodiment of rolling cardboard cat scratcher, generally designated 20.

The rolling cardboard cat scratcher 10 has an aperture 21 cut through to the spline guide 12 and to further entice a cat one or more feathers 22 may be glued 23 to the internal spline 14.

Figure 3:
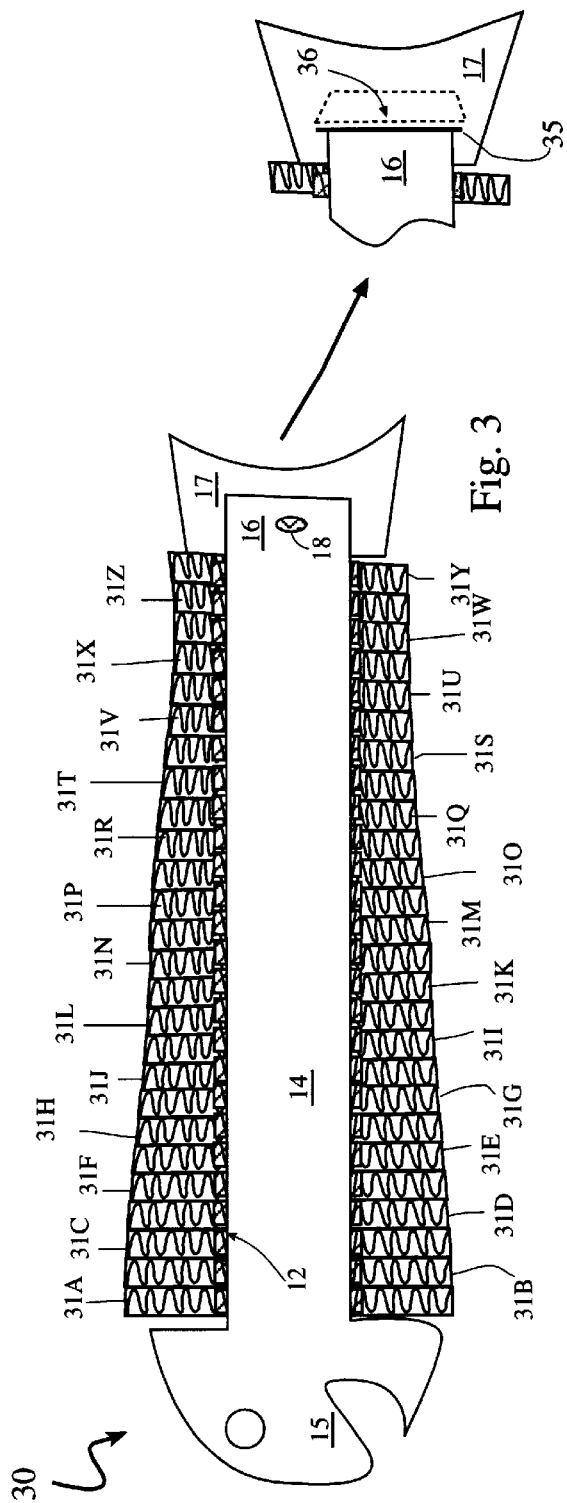
FIG. 3 illustrates a side view of an alternate embodiment of the device.

Referring now to FIG. 3 there is illustrated a cut-away side view of an alternate embodiment of the rolling cardboard cat scratcher generally designated 30.

Figures 4A, 4B:
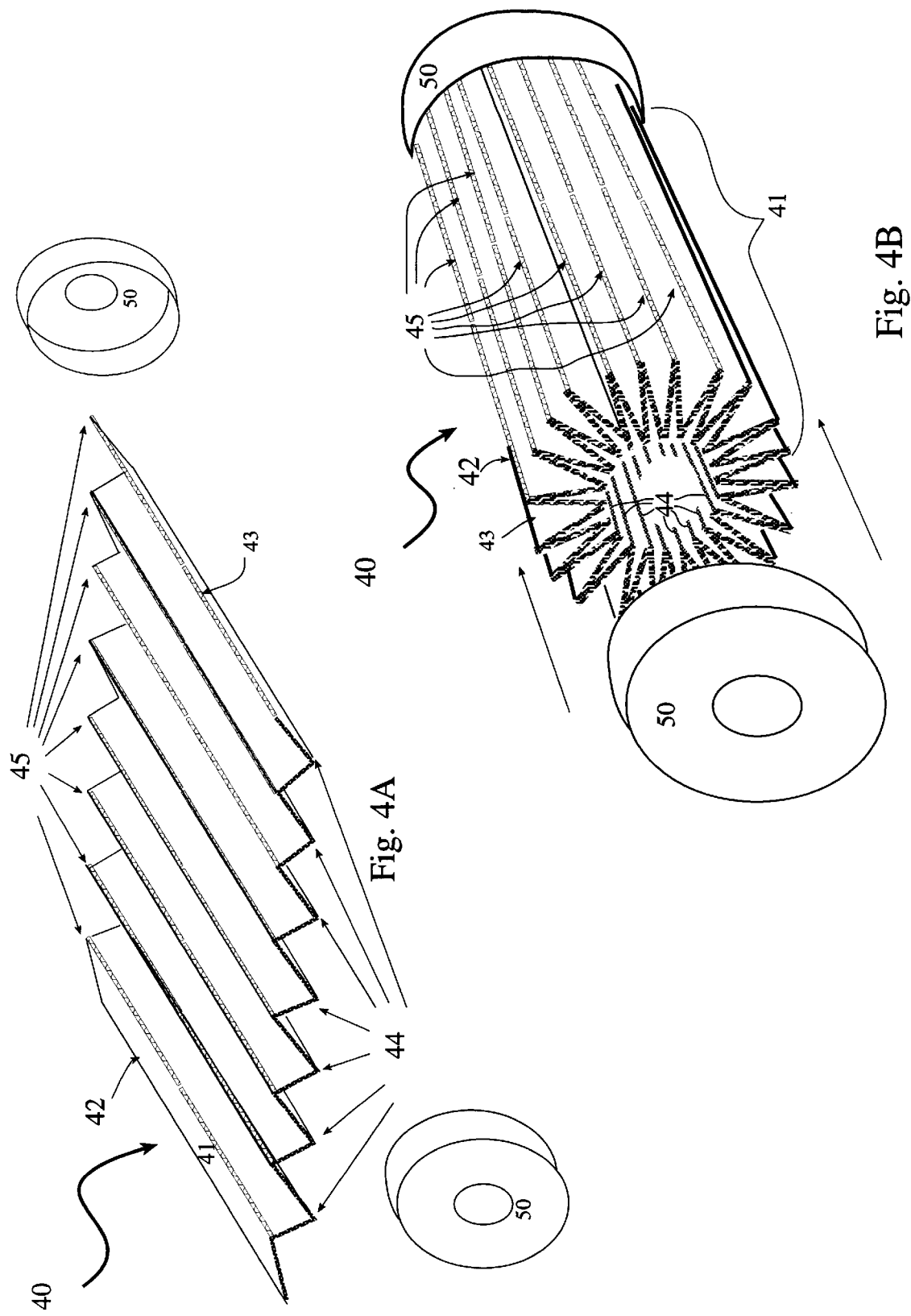
FIG. 4A illustrates a component view of an alternate embodiment of the device.
FIG. 4B illustrates a assembly view of the embodiment of FIG. 4A.

The tubular scratching insert 31 is a roughly conical tube formed of a plurality of die-cut circular corrugated cardboard disks, each of a decreasing diameter, 31A–31Z which are held together by disk spline guides 12 die-cut in the center of each corrugated cardboard disk 31A–31Z. A rigid disk support structure 13 is formed with an internal spline 14 extending from a representational head 15. A narrow end 16 is formed on the internal spline 14 remote from the representational head 15. The cardboard disks 31A–31Z may be held together by inserting the narrow end 16 through the disk spline guides 12 and then attaching the representational tail 17, onto the narrow end 16 with a rivet 18, whereby the corrugated cardboard disks 31A–31Z are held firmly in place on the internal spline 14 of disk support structure 13 between the representational head 15 and representational tail 17. Referring now to FIG. 4A and 4B there is illustrated a component and assembly view of an alternate embodiment of the rolling cardboard cat scratcher generally designated 40.

A planar corrugated cardboard sheet 41 with a first end 42 and a second end 43 is scored partially through the first side 44 and scored partially through the second side 45 to allow the planar corrugated cardboard sheet to be folded to form a plurality of connected strips of equal size.

Affixing the first end 42 and the second end 43 together forms a tube, by drawing the scored end of the first side 44 towards the center of the tube a tubular fan is created with the corrugations of the scored edges of the second side 45 suspended radially to form the tube.

To hold the tubular shape, and allow the device to roll across a floor, the folded corrugated cardboard sheet 41 may be affixed with glue into the circular front and rear end caps 50. An alternate method for inhibiting the cardboard disks 31A–31Z from being removed from the support structure 13 is a catch 35 formed in the representational tail 17 and a corresponding latch 36 formed on the narrow end 16. Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A rolling cardboard cat scratcher, comprising:
    a) an elongated receiving support with an enlarged first end and a second end;
    b) a plurality of conjugated cardboard disks each with a support attaching guide, of a diameter less than said enlarged first end, formed therein;
    c) a cylindrical cardboard scratching surface formed by sliding said corrugated cardboard disks on to said second end and up against said enlarged first end; and,
    d) a stopping means affixed to said second end whereby said stopping means prevents the movement of said corrugated cardboard disks back off said second end.

2. The arrangement according to claim 1, further comprising a measure of catnip which may be added to said corrugated cardboard disks to provide additional enticement for the cat to scratch at the device.

3. The arrangement according to claim 1, wherein said enlarged first end is in the shape of a representational fish head and said second end stop is in the shape of a representational fish tail.

4. The arrangement according to claim 1, wherein said corrugated cardboard disks form a tapered cylindrical rod.

5. The arrangement according to claim 4, wherein said tapered cylindrical rod has its smallest diameter at said first end and largest diameter at said second end, whereby upon rolling said cylindrical rod will roll in a radius opposite to said second end.

6. The arrangement according to claim 1, wherein said stopping means is a enlarged tail end affixed to said second end.

7. The arrangement according to claim 6, wherein said support attaching guide is die-cut through the central area of each corrugated cardboard disk.

8. The arrangement according to claim 7 further comprising:
    a) a barbed end formed on said second end; and,
    b) a barbed end guide formed via the juxtaposition of said barbed end against said die-cut attaching guide wherein the withdrawal of said barbed end, once inserted through said die-cut attaching guide, is inhibited.

9. The arrangement according to claim 6, wherein said enlarged tail is attached via a rivet to said second end.

10. The arrangement according to claim 6, wherein said enlarged tail is attached via a catch formed on said enlarged tail which snaps into a corresponding latch formed on said second end.

11. The arrangement according to claim 6, wherein said enlarged tail is attached to said second end via a sonic weld.

12. The arrangement according to claim 1, wherein said corrugated cardboard disks form a cylindrical rod with at least one tapered region.

13. A rolling cardboard cat scratcher, comprising:
    a) a plurality of corrugated cardboard disks attached together to form a cylindrical rod having at least one tapered region encompassing a plurality of the disks and a length greater than the diameter of the largest disk; and,
    b) a means for affixing said corrugated cardboard disks together.

14. The arrangement according to claim 13, further comprising a measure of catnip sprinkled on the corrugated surface of said plurality of disks.

15. The arrangement according to claim 13, wherein said tapered cylindrical rod has its smallest diameter at said first end and largest diameter at said second end.

16. The arrangement according to claim 13, wherein said at least one tapered region extends at least from roughly the middle of said cylindrical rod towards an end.

* * * * *